United States Patent [19]

Cherenson

[11] 3,751,218
[45] Aug. 7, 1973

[54] APPARATUS FOR EXPANDING RESIN

[75] Inventor: Edward L. Cherenson, Waltham, Mass.

[73] Assignee: Artisan Industries Inc., Waltham, Mass.

[22] Filed: Aug. 27, 1971

[21] Appl. No.: 175,548

[52] U.S. Cl. .................. 432/134, 425/4, 432/118, 264/51, 193/10, 214/18 K
[51] Int. Cl. .................. F27b 15/00, F26g 11/02
[58] Field of Search .................. 263/21 B, 33, 21 C; 264/51, 53; 214/18 K; 193/10; 425/4; 34/108, 136; 432/13, 134, 118, 105–108

[56] References Cited
UNITED STATES PATENTS

| 3,717,937 | 2/1973 | Thompson | 34/108 |
| 2,828,549 | 4/1958 | Guggenheim | 34/136 |
| 2,728,146 | 12/1955 | Cody | 34/136 |
| 2,578,166 | 12/1951 | Bill | 34/136 |
| 3,603,001 | 9/1971 | Arnold | 34/136 |
| 3,671,026 | 6/1972 | Mills et al. | 263/21 B |
| 3,593,430 | 7/1971 | Thompson | 263/33 R |
| 3,642,265 | 2/1971 | Burmeister et al. | 263/21 C |
| 3,639,551 | 2/1972 | Leach | 263/21 B |
| 3,377,653 | 4/1968 | Buonaiuto | 264/51 |
| 3,542,217 | 11/1970 | Deynat | 263/33 |
| 3,225,126 | 12/1965 | Bridges et al. | 264/51 |
| 3,407,511 | 10/1968 | Camm | 263/33 R |

Primary Examiner—John J. Camby
Assistant Examiner—Henry C. Yuen
Attorney—Richard P. Crowley et al.

[57] ABSTRACT

An apparatus for the production of low-density expandable resin beads, which apparatus comprises: a vessel to contain the beads; an inlet to introduce beads to be expanded into the interior of the vessel; an outlet to discharge from the vessel the beads after expansion to the desired density; means to rotate the vessel and to move the beads in a path from the inlet to the outlet of the vessel; and means to heat the beads while in the vessel from one state to another desired expanded state. Baffles are spaced apart from the interior wall of the vessel, and the baffles which are in the path of the beads are adapted to control the residence time of the beads as they move from the inlet to the outlet end of the vessel, and to maintain the beads as they move from the inlet to the outlet in a substantially uniform condition of expansion.

25 Claims, 4 Drawing Figures

PATENTED AUG 7 1973　　3,751,218
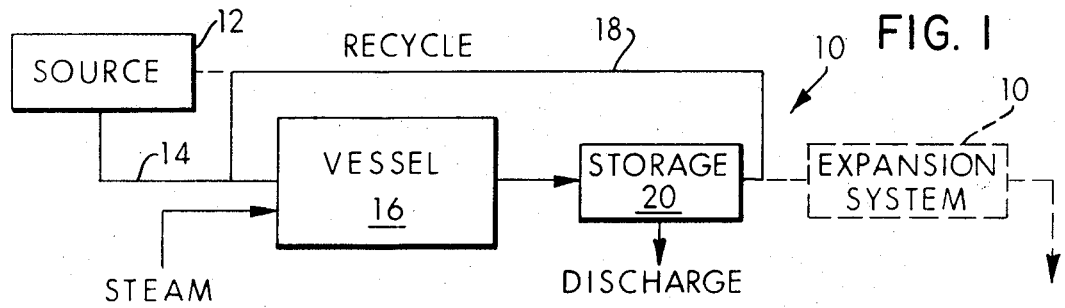
FIG. 1
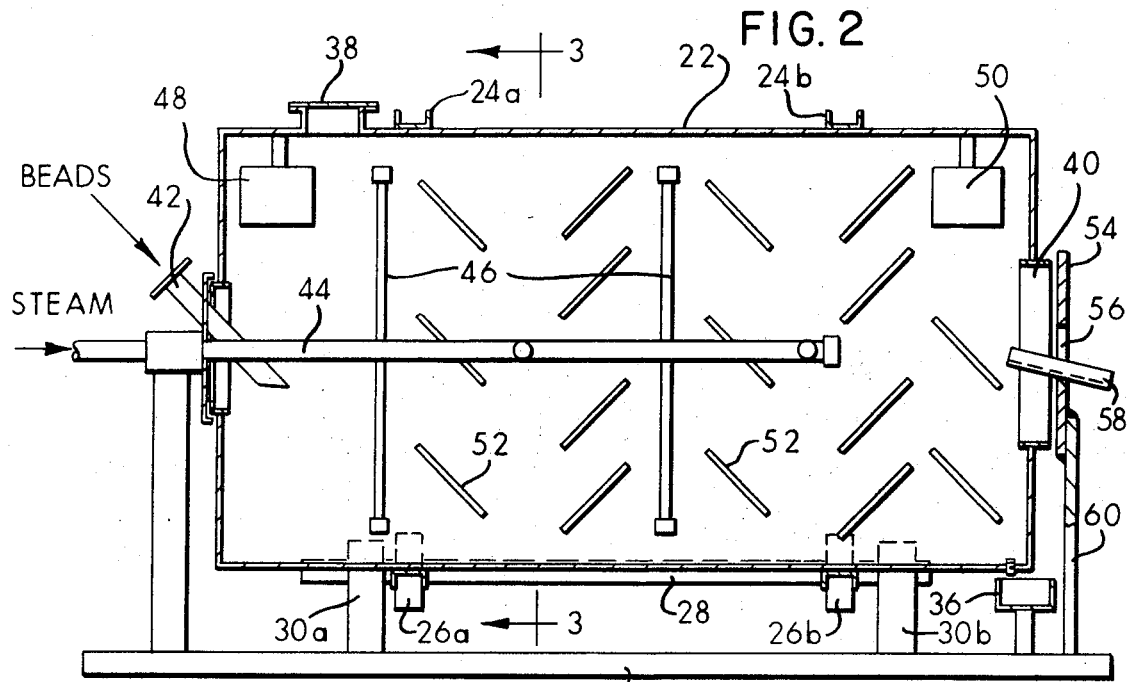
FIG. 2
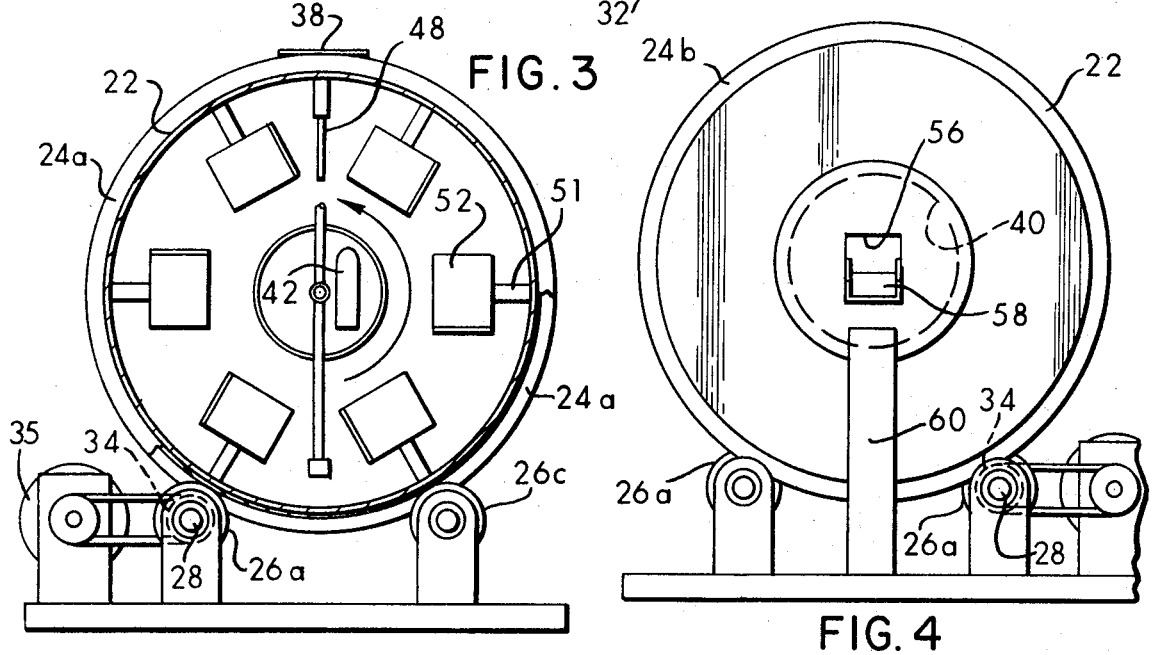
FIG. 3
FIG. 4

APPARATUS FOR EXPANDING RESIN

BACKGROUND OF THE INVENTION

Expandable resin beads, such as expandable polystyrene beads, have been employed to prepare light-weight cellular molded particles, as well as low-density loose filled packing and dunnage materials. Typically, such bead materials contain an expanding agent, such as a liquified hydrocarbon like pentane, which, when subject to heat, expands the heat softened resin bead to form a low-density cellular material. The expandable bead material may be expanded within a mold to form a light-weight cellular form unitary particle, such as a packing form, or expanded in loose filled peanut, disc or other shaped bead form of low density. Typically, for example, beads are expanded to less than 1 pound per cubic foot to serve as loose filled packing and dunnage materials. When employed as loose filled packing materials, very low foam densities are desired, such as 0.4 to 0.8 pounds per cubic foot. Such loose filled material made of expandable polystyrene beads may be prepared by mixing expandable polystyrene beads in the presence of steam at atmospheric pressure within a vessel, such as a horizontal rotating drum, for a finite period of time to produce free flowing low-density products.

In one process, expandable beads, typically at a density of 30 pounds per cubic foot or more, e.g. 40 pounds per cubic foot, are continuously fed to a device wherein they are heated by steam and then discharged as a free-flowing product having a bulk density of, for example, 0.8 to 0.9 pounds per cubic foot. In another process, the first pass expanded bead material is then transferred, such as by air conveyers, to a plastic screen storage hopper for cooling and aging before use, or employed as a second pass feed stream wherein the beads are then, after aging 8 to 24 hours, recycled again to a heated expanding device wherein they are again heated by steam which causes the expanded material to undergo another expansion to a final density as low as 0.5 pounds or less per cubic foot.

Another technique for producing low-density loose filled polystyrene packing has been the employment of a steam-jacketed vessel as an expander device wherein the internal walls of the vessel are heated through an external steam jacket, and the interior of the vessel maintained under a vacuum. By this technique, the recycling of preexpanded beads in a second, third, or multiple pass system to obtain very low-density loose filled material is reported avoided. However, such vacuum devices are considerably more expensive than horizontal atmospherically operated expander vessels which employ a multiple pass system.

One of the difficulties associated with the atmospheric and vacuum-heated expander devices, particularly in the production of low-density bead material, such as polystyrene, has been the production of expanded bead material of uniform expansion and quality. In some prior art devices, the expanded polystyrene low-density beads discharged from such devices have been expanded to various nonuniform states of expansion. Further, when the temperature of such devices is increased, the increase has often resulted in waste in that some of the expanded softened beads stick together. Another difficulty associated with prior art devices has been the lack of suitable techniques to remove the expanded bead material from the device with beads of the desired expansion and quality in a continuous manner.

It is an object of my invention to overcome some of the difficulties associated with prior art expander devices, particularly horizontal atmospheric expanders for polystyrene bead material.

In particular, it is one object of my invention to provide an improved apparatus for the production of low-density expandable resin beads, whereby expandable bead material is produced on a continuous basis with the bead material characterized by being uniform in size and degree of expansion and suitable to be employed as loose fill material.

A further object of my invention is to provide a new and improved apparatus for production of low-density expandable bead materials, particularly large beads of irregular shape polystyrene bead materials, wherein the expanded bead material may be rapidly and efficiently removed in a desired expanded condition from the interior of the apparatus.

Another objet of my invention is to provide a new and improved process for producing loose fill expanded bead material, particularly large irregularly shaped polystyrene bead material, and a process for removing such bead material in an efficient and continuous manner after expansion.

SUMMARY OF THE INVENTION

My invention comprises an apparatus for and a method of producing low-density expandable resin beads, whereby beads of substantially uniform quality and size are produced in an efficient and continuous manner. My apparatus and method is particularly adapted for the production of loose fill polystyrene packing and dunnage material in an atmospheric-type expanding device employing steam heating of the material in the device. My apparatus and method may be employed both in single pass and multiple pass systems of bead expansion.

My apparatus and method in one embodiment relates to means to control the residence time of the beads in the device as they move from one inlet end to the other outlet end of the device, thereby permitting the relatively uniform expansion of the material and the discharge of the beads of substantially uniform size and degree of expansion. My invention concerns in another embodiment an apparatus for and method of discharging expandable bead material from the interior of the device so that an expanded bead material is removed at the desired rate and from a desired internal position within the device. A further embodiment of my invention concerns an apparatus for and a method of combining means to control the residence time and a means to discharge efficiently the expandable bead material.

In one embodiment, my apparatus comprises an apparatus for the production of expandable resin beads, particularly low-density expandable polystyrene resin beads of less than 1 pound per cubic foot, which beads are prepared as loose fill beads of a desired form or shape, and which apparatus comprises: (a) a vessel to contain the expandable beads, such as a horizontal or substantially horizontally axised vessel; (b) inlet means to introduce beads into the interior of the vessel for expansion from one state to a desired expanded state; (c) outlet means to discharge the beads after expansion to the desired density from the interior of the vessel; (d) means to cause the movement of the beads while being expanded in the vessel from the inlet to the outlet, such as means to rotate a horizontal vessel to move the beads from the inlet to the outlet of the vessel; and (e) means to heat the beads while in the vessel from one state to a desired expanded state, such as by the direct injection of steam into the interior of the vessel, in which one embodiment of my improvement comprises baffle means interior to the vessel, the baffle means positioned in the flow path of the beads from the inlet to the outlet and adapted to control the residence time of the beads as they move from the inlet to the outlet of the vessel and to maintain the beads as they move through the vessel at the same relative degree of expansion, thereby producing expanded beads after discharge into the vessel which are substantially uniform in size and suitable for use as loose fill low-density packing and dunnage material.

My baffle means comprises a plurality of paddle-like baffles secured by thin rod elements to the interior wall of the vessel. The rods extend for a short distance outwardly, one end secured to the interior wall of the vessel walls, and the other end of the rod containing a baffle either in the form of a paddle, square, or other shape. A plurality of paddle-like baffles may be employed throughout the length of the vessel or in select portions. A plurality of baffles may be employed in each plane, and a plurality of planes employed. The baffles in different planes may be aligned or offset, but in one embodiment are particularly and progressively offset from one another as they extend from the inlet to the outlet of the vessel. The paddle-like baffles may be altered in their plane or configuration relative to the axis of the vessel so that the baffles can be rotated about the individual support rods to provide any angle of deflection, whereby the advancement or retardation of the flow of the beads within the interior of the vessel may be easily and readily controlled as desired.

I have found that a series of arcuate-type baffles secured directly at the upstream and downstream ends of the vessel, which baffles are substantially arcuate in shape and secured directly to the internal walls of the vessel, are not satisfactory for the purposes of my invention and fail to produce low-density beads of uniform quality. Such baffles and similar baffles tend to hold up and impede the free flow of the beads as they move from the inlet to the outlet of the vessel, resulting in nonuniformity in the expanded beads discharged. Also considerable waste is encountered because of the over or underexpansion of the beads. Additional waste is encountered due to excessive residence times and the fusing together of some of the individual beads due to such excessive residence in the heated interior of the vessel. Furthermore, such baffles often cause loss of beads by holding up beads for an exceptionally long period of time within the vessel and not discharging such beads. Accordingly, my invention employs an apparatus in which the baffles are spaced apart from the interior wall of the vessel. The employment of short rods with paddle-like baffles at one end permits the free flow of the beads as they progress along the internal wall of the vessel, but the paddle-like baffles as positioned permit control of the residence time of the beads in the interior flow path of the beads in the vessel.

I have found that it is also desirable to provide paddlelike baffles which may be adjusted in their angle of deflection retative to the flow path of the beads through the vessel so as, for example, to retard the advancement of the bead material in one zone of the vessel, e.g. the first half, and to enhance the advancement of the preexpanded beads in another zone, e.g. the last half of the vessel, or any desired controlled sequence. For example, to retard the advancement of the beads at the upstream end of the vessel, the paddle baffles may be set at an angle of for example 30 to 60 degrees, while advancement of the beads at the downstream end may be accomplished by setting the baffles at for example 30 to 60 degrees counterclockwise, as shown more particularly in the description of the preferred embodiment of the invention.

My invention also comprises a process for the expansion of an expanded resin bead material from one state of expansion or nonexpansion to a greater state of expansion, such as the expansion of an expandable polystyrene bead material from a state of 30 to 50 pounds per cubic foot to an expansion of less than 5 pounds per cubic foot; for example, from 0.5 to 1.0 pounds per cubic foot, which process comprises: heating the expandable bead material to a temperature sufficient to expand the bead material to the desired degree of expansion, while flowing, such as by tumbling such bead material along a predetermined flow path while so heating the beads, the improvement which comprises: controlling the residence time of the bead material along said flow path by impeding or enhancing the residence time of the bead material in the flow path as desired, but within the flow path, and not about the exterior surface of the flow path, thereby providing for a production of a bead material of substantially uniform expansion size. My method in particular comprises an improvement whereby the resin bead material is controlled in residence time along a flow path so that the first half, e.g. one-fourth to one-half, of the flow path has a greater residence time than the second half, e.g., one-fourth to one-half, of the flow path where the flow path is uniformly heated.

My apparatus and method may be usefully employed, particularly in atmospheric-type devices, but may also be employed in vacuum or superatmospheric expansion devices, if desired. My apparatus and method will be described in particular in connection with the expansion of polystyrene beads; that is, styrene resins having an expanding agent such as pentane contained therein. My apparatus and method may be employed with any expandable loose fill material subject to expansion or heating, and regardless of the shape of the expandable bead material employed, although my device as illustrated is particularly useful in the production of S or peanut shaped expandable polystyrene bead material. In addition, it is recognized that other techniques may be employed for placing the paddle-like baffles in the interior of the beads, such as by securing the baffles within the flow path other than to the interior wall of the vessel, such as to the steam line. However, the preferred embodiment of my device comprises the employment of paddle-like baffles secured by thin rods to the interior wall of the vessel wherein the interior wall and the paddles of the vessel rotates and wherein the paddles are described in an offset relationship in a series of planes.

In another embodiment an apparatus and method for the production of low-density expandable bead materials, the improvement, which may be employed alone or in combination with the improvement of my other embodiment, comprises an adjustable or movable discharge means, such as a chute, wherein the adjustable chute is placed within the outlet of the vessel. The chute is adjusted and moved within the interior of the vessel in various degrees and in various positions, thereby permitting the removal of the expanded bead material from the interior of the vessel at the proper rate without holdup of the loose filled expandable material. In addition, my improved discharge means also permits the chute to be withdrawn when the heating of the vessel is terminated, such as when the steam is shut off, thereby permitting a portion of the expanded resin beads to continue to rotate and to ultimately remain in the vessel until the next charge of expandable bead material is introduced into the vessel. My invention includes a method for the rapid removal of expanded bead material from the interior of the vessel, which method comprises: the heating of an expandable bead material and the removing of a bead material from a flow path in a desired expanded state, the improvement which comprises: removing the expanded material in the interior of its flow path prior to such expanded material flowing to the most distant downstream end of the vessel.

BRIEF DESCRIPTION OF THE DRAWINGS

FIG. 1 is a block diagram of a multiple pass resin bead expansion system employing my expansion apparatus;

FIG. 2 is a sectional view of the expansion apparatus of my invention;

FIG. 3 is an end view of FIG. 2 taken along lines 3—3; and

FIG. 4 is a sectional view of the discharge chute of the invention.

DESCRIPTION OF THE PREFERRED EMBODIMENT(S)

Referring to FIG. 1, the expansion system 10 is shown wherein beads from a source 12 communicate through feeder 14 to vessel 16. Steam is introduced into the vessel 16 and the expanded beads are kept in storage 20. Depending upon the density of beads desired, the beads may be discharged from storage 20, recycled, either back to the source 12 or to the feed line 14; or alternatively, from storage the beads may be transferred to another expansion system shown in dotted lines. Beads transferred from one unit to the next may be by any of the conventional methods employed, such as through the use of blowing systems, belts, extrusion-type feeders, conveyors, etc..

Referring to FIG. 2, the vessel is shown in greater detail and comprises a drum 22 having circumferential tracks 24a and 24b secured to the outer wall thereof. Drive wheels 26a and 26b are received within the tracks 24a and 24b respectively and the drive wheels are secured to drive shaft 28. Drive shaft 28 is journaled through bearing blocks 30a and 30b which are secured to support 32. A drive pulley 34 is secured to drive shaft 28 and a motor 35 or other drive mechanism is normally belted to the drive pulley 34. A drain pan 36 is disposed under the downstream end of the drum 22 and a collar 40 is disposed at the end of the drum 22 as shown. Inspection hatch 38, feed chute 42, and steam line 44 are disposed at the upstream end of the drum 22. The steam line extends through the drum and has sparges 46 extending axially outward from the steam line 44. A rotary face seal with filled tetrafluorethylene resin seat material prevents steam from escaping from the drum where the steam line 44 enters the drum. Inlet and outlet baffles 48 and 50 are disposed at the upstream and downstream ends of the drum 22. Four sets of baffles, each set disposed in a common plane throughout the interior of the drum, are secured thereto by support rods which support rods are secured to the inner wall of the drum and extend inwardly toward the center of the drum. The baffles 52 are of a similar size and construction as baffles 48 and 50. Of course, they may be of a dissimilar construction relating to geometric configuration, distance from the inner wall of the drum, and degree of rotation about the axis of the support rod.

At the discharge end of the drum a plate 54 having an orifice 56 shown more clearly in FIG. 4, which orifice registers with the orifice defined by the collar 40, is spaced slightly apart from the collar 40 and is supported by support stand 60. Discharge chute 58 is disposed within the orifice 56.

In FIG. 3 an end view of the drum taken along line 3—3 is shown wherein the baffles 52 extend inwardly on support rods 51 which support rods are secured to the inner wall of the drum. The baffles are adaptd to rotate about the support rods to vary the angle of the baffle with respect to the flow of the beads through the drum. Preferably, the baffle is rotatably secured to the support rod, such as by a set screw passing through the baffle and into the support rod and the support rod itself is fixedly secured to the inner wall of the drum. Of course, the baffle and the support rod could be fixed one to the other and the support rod be secured to the inner wall of the drum in a rotatable manner.

Referring to FIG. 3, guide wheel 26c is shown, it being understood that there is a corresponding guide wheel in track 24b which would be identified as 26d to prevent axial movement of te drum during rotation.

In FIG. 4, the adjustable chute 58 is more clearly shown wherein the plate 54 has cut therein an inner chute at an angle of approximately 45° from the horizontal extending upwardly toward the drum. The chute 58 is received in the inner chute of the orifice and is slidably engaged in a friction-tight manner whereby the chute 58 may be reciprocated within the orifice 56 to intercept the flow of the beads in the drum and withdraw them from the drum.

Referring to FIG. 2 in the operation of the invention, the motor which is not shown and which is belted to drive pulley 34 is actuated whereby the drive rollers 26a and 26b engage the tracks 24a and 24b to rotate the drum about its axis. Steam is introduced through steam line 44 and is discharged through sparges 46 into the interior of the drum. The baffles 48, 50, and 52 are preset in their angle of deflection in reference to the flow of the beads through the drum, and in reference to their distance from the inner wall of the drum to ensure that the beads will be agitated through deflection against the baffles wherein their progress is either enhanced or retarded. Chute 58 disposed in orifice 56 is introduced into the interior of the drum 22 through the collar 40. Beads, such as S-shaped polystyrene beads, are transferred from source 12 to the vessel 16; that is, into the interior of the drum 22 through inlet chute 42. The feeder may be a flexible internally disposed extruder-type feeder. For purposes of this example, the beads will be considered as those having a density of about 40 pounds per cubic foot and where it is desired to expand them and then discharge them as a free-flowing product having a density of about for example 0.8 to 0.9 pounds per cubic foot. The rotation of the drum, of course, rotates the baffles secured to the inner wall thereof. The inlet baffle 48 is angled such that the beads striking the baffle 48 will have a vector component imparted thereto to advance the beads in the direction of the downstream or discharge end of the rotating drum. This particular baffle 48 also ensures that there is no unwanted accumulation of beads at the inlet or upstream end of the drum 22. The steam sparges 46, of course, are stationary while the drum and baffles rotate. The first set of baffles 52 shown in FIG. 2 are angled to retard the advancement of the beads. The second set of baffles in the same plane are angled to enhance the flow of the beads through the drum. The third set of baffles are angled to retard the flow of the beads. The fourth set are disposed to enhance the movement of the beads through the drum. Outlet baffle 50 maintains the beads in an agitated condition and aids in the removal of the beads from the drum onto the intruding chute 58.

The first set of baffles 52 would, referring to FIG. 3, comprise six baffles equally spaced apart in the same plane on the interior of the drum. The second set, referring to FIG. 2, comprises eight baffles lying in the same plane offset from the first six baffles but equally spaced apart in the same plane. This pattern is repeated for the third and fourth sets of baffles of the drum. It is to be understood that the baffles may be disposed in any random arrangement on the interior wall of the drum. If they are disposed in planes extending along the wall of the drum, they may be equally spaced within the plane as shown in the preferred embodiment. Some may be equally spaced and some nonequally spaced; that is, they may lie in the same plane but in a random arrangement. Further, the baffles of the drum, if lying in planes and if the same number of baffles are lying in each plane(s), they may either be aligned or offset from one another when viewing the baffles along an axis as in FIG. 3. The beads as they progress through the drum are agitated by the baffles; and as described, their flow is alternately retarded and enhanced as the beads strike the baffles.

The beads having now been expanded to the desired density are received on chute 58 and discharged from the drum. If, after the baffle angles have originally been set and the amount of steam to be discharged into the drum and the speed of rotation of the drum have been fixed during a particular run and it is decided that the beads should have a longer residence time, then the chute 58 may be withdrawn from the drum a further distance than shown whereby the expanded beads within the drum will have remained within the drum a longer time prior to discharge. Conversely, if it is desired to remove the beads sooner, then the discharge chute 58 may be injected further into the drum to remove the beads from the drum after a shorter residence time. This feature of the movable chute is advantageous in that if the beads are not being discharged at the proper density, then mere mechanical adjustment of the chute can overcome this problem rather than modifying the rate of steam into the drum, the rpm's of the drum, and/or the alignment and number of baffles within the drum. Of course, if the adjustment of the chute is not satisfactory, then of course any of the three previously mentioned conditions may be modified, particularly the number and angulation of the baffles within the drum to control the residence time of the beads.

The adjustable chute is shown best in FIGS. 2 and 4 wherein the plate 54 is characterized by a square-like orifice 56 therein. The bottom portion of the orifice 56 is preferably angled whereby the chute 58 fits within the orifice 56 at the predetermined angle and is frictionally engaged therein whereby it may be inserted or withdrawn from the drum as desired. Other expedients may be employed to vary the angle of the chute in reference to the axis of rotation of the drum, such as by journaling the chute to the sides of the orifice 56 while allowing reciprocal movement of the chute into and out of the drum. This may be accomplished by placing tracks or troughs on either side of the chute 58, and wheels journaled to the sides of the orifice 56 may be received in the troughs. Also, if desired, the plate 54 may be journaled to the support frame 60 to provide an axis of rotation for the plate 54, and in this embodiment the chute 58 would be able to rotate. Any combination of the preferred embodiment or the previously two described embodiments may be used as desired.

Having described my invention, what I now claim is:

1. An apparatus for the production of expandable resin beads, which apparatus comprises in combination:
   a. a generally horizontally disposed vessel having an interior wall surface, the vessel adapted to contain the expandable beads;
   b. an inlet to introduce beads to be expanded into the interior of the vessel;
   c. an outlet to remove expanded beads from the interior of the vessel after expansion of the expandable beads to the desired density, the beads moving from the inlet to the outlet within the vessel;
   d. means to rotate the vessel about its axis;
   e. means to heat the beads while in the vessel from one expandable state to a desired expanded state; and
   f. baffle means interior of the vessel comprising:
      i. a plurality of radially extending rod-like supporting elements, one end of each of the elements secured to the interior wall surface of the vessel for rotation therewith;
      ii. a plurality of paddle-like baffle elements, each baffle element secured to the other end of a supporting element, the baffle elements spaced apart from the interior wall surface of the vessel by the supporting elements to permit the substantially unimpeded flow of the expandable resin beads along the interior wall surface of the vessel, the baffle elements generally positioned to present the paddle-like surface of the baffle elements toward or away from the flow path of the resin beads as they more through the interior of the vessel from the inlet to the outlet, thereby controlling the residence time of the beads in the vessel.

2. The apparatus of claim 1 wherein the vessel is a cylindrical vessel characterized by an interior wall surface free of impediments, other than the supporting elements, to the flow of the beads along the wall surface.

3. The apparatus of claim 1 wherein the means to heat the beads while in the vessel includes means to introduce steam interior of the vessel.

4. The apparatus of claim 3 wherein the means to introduce steam interior of the vessel includes a centrally disposed steam line within the vessel, the steam line having a plurality of outwardly extended sparge elements extending generally outwardly and perpendicularly from the steam line.

5. The apparatus of claim 1 wherein the baffle elements are adjustable in the angular position of the paddle-like surface, thereby permitting the advancement or retardation of the beads as they move from the inlet to the outlet of the vessel.

6. The apparatus of claim 1 wherein the paddle-like surface of the baffle elements extends generally perpendicular to the axis of the vessel when viewed axially.

7. The apparatus of claim 1 wherein the outlet to discharge the beads from the vessel includes a chute means received within the interior of the vessel and adapted to remove the beads prior to reaching the outlet.

8. The apparatus of claim 1 wherein a plurality of the paddle-like surfaces of the baffle elements is positioned in a first plane generally perpendicular to the axis of the vessel to retard the advancement of the beads in the first half portion of the vessel, and in a second plane generally perpendicular to the axis of the vessel to enhance the flow of the beads in the second downstream half portion of the vessel.

9. The apparatus of claim 1 wherein the baffle elements comprise a plurality of baffle elements in a series of planes within the vessel, the baffle elements in at least one plane offset from the baffle elements in the following plane when viewed along the axis of the vessel.

10. The apparatus of claim 1 wherein the paddle-like elements are disposed with reference to the axial flow path of the beads as they move from the inlet to the outlet of the vessel at an angle of about 30° to 60° from the plane perpendicular to the axis of the vessel, so as to retard or advance the movement of the beads within the vessel 11. The apparatus of claim 1 which includes a plurality of paddle-like baffle elements in a series of separate planes within the vessel which includes in series from the inlet to the outlet a first set of paddle elements with the paddle surface angled against the axial flow of the beads in the vessel to retard the advancement of the beads, a second set of paddle elements with the paddle surface angled to enhance the flow of the beads in the vessel, a third set of paddle elements with the paddle surface angled to retard the flow of axial beads in the vessel, and a fourth set of paddle elements with the paddle surface angled to enhance the flow of the beads in the vessel to the outlet.

12. The apparatus of claim 1 wherein the paddle-like baffle elements have a generally flat rectangular shape.

13. The apparatus of claim 1 wherein the baffle elements are in a series of planes, each plane generally perpendicular to the axis of the vessel, each plane having a plurality of baffle elements, and wherein the planes are generally uniformly spaced apart within the vessel.

14. The apparatus of claim 7 wherein the chute means comprises an adjustable chute positioned within a central outlet of the vessel, the chute adapted to be adjusted and moved within the interior of the vessel at various angles and positions to permit the removal of the expanded bead material from the interior of the vessel prior to the expanded bead material reaching the outlet of the vessel, and to permit the chute to be withdrawn wholly from the interior of the vessel.

15. The apparatus of claim 14 which includes a chute centrally positioned within the outlet of the vessel, the chute positioned at an angle of approximately 45°, and extending upwardly into the interior of the vessel, the chute slidably engaged in a friction-type manner in the outlet, whereby the chute may be extended into the interior of the vessel to intercept the flow of beads in the drum prior to the beads reaching the outlet, or being withdrawn from the interior of the drum.

16. An apparatus for the production of expandable resin beads, which apparatus comprises in combination:
 a. a generally horizontally disposed cylindrical vessel having an interior wall surface and adapted to contain expandable beads;
 b. a generally centrally disposed inlet at one end of the vessel to introduce beads to be expanded into the interior of the vessel;
 c. a generally centrally disposed outlet at the other end of the vessel to discharge from the vessel the beads after expansion to the desired density state;
 d. means to rotate the vessel about its horizontally cylindrical axis;
 e. means to introduce steam interior of the vessel so as to heat the beads while in the interior of the vessel from one state to a desired expanded state; and
 f. baffle means interior of the vessel comprising:
  i. a plurality of short rod-like supporting elements having a one end and another end; and
  ii. a plurality of paddle-like baffle elements, each baffle element secured to one end of a rod element, the other end of the rod element secured to the interior wall surface of the vessel and adapted for movement with the vessel, the baffle elements spaced apart from the interior wall surface of the vessel by the length of the rod elements, the plurality of baffle elements disposed in a series of planes within the vessel, each plane having a plurality of baffle elements therein, the planes generally perpendicular to the axis of the vessel, the plurality of paddle-like surfaces of the baffle elements positioned in each plane to advance or retard the flow of the resin beads within the interior of the vessel as the beads move from the inlet to the outlet of the vessel, thereby permitting the flow of expandable resin beads along the interior wall of the vessel while controlling the residence time of the beads in the vessel.

17. The apparatus of claim 16 which includes an inlet baffle element having a paddle-like surface disposed on a short rod-like supporting element, one end of the rod element secured to the baffle and the other end secured to the interior wall of the vessel, the inlet baffle element having its paddle-like surface disposed generally axially with the axis of the vessel, the inlet baffle positioned between the inlet of the vessel and the first plane of the baffle elements, the inlet baffle adapted to impart a vector component to the beads to advance the beads toward the outlet.

18. The apparatus of claim 16 which includes an outlet baffle element having a paddle-like surface disposed on a short rod-like supporting element, one end of the rod element secured to the baffle and the other end secured to the interior wall of the vessel, the inlet baffle element having its paddle-like surface disposed generally axially with the axis of the vessel, the outlet baffle element positioned between the outlet of the vessel and the last plane of baffle elements, the outlet baffle maintaining the expanded beads in an agitated state prior to removal of the beads from the rotating vessel.

19. The apparatus of claim 16 wherein the paddle-like baffle elements are disposed in a manner equally spaced apart within the same plane.

20. The apparatus of claim 16 wherein the paddle-like baffle elements of one plane are offset from the paddle-like baffle elements of the following plane when viewed along the axis of the vessel.

21. The apparatus of claim 16 wherein the paddle-like surfaces of the baffle elements are disposed in an angle from about 30° to 60° from the plane perpendicular to the axis of the vessel.

22. The apparatus of claim 16 wherein the paddle-like baffle elements are adjustable in the angular position of the paddle-like surface so as to provide for the advancement or retardation of the beads as they move in the flow path from the inlet to the outlet of the vessel.

23. The apparatus of claim 16 which includes a chute means disposed within the outlet of the vessel, the chute means comprising a collar within the outlet and an adjustable chute within the collar, the chute adapted to be adjusted and moved within the upper portion of the interior of the vessel at an angle from the axis of the vessel, the chute slidably engaged in a friction-type manner within the outlet of the vessel.

24. The apparatus of claim 16 which includes four separate planes of baffle elements, the planes generally disposed perpendicularly to the cylindrical axis of the vessel, the paddle-like baffle elements in each plane spaced equally apart, the first and second planes disposed in the first half of the vessel, and the third and fourth planes disposed in the last half of the vessel, the first and third planes having baffle elements with the surfaces disposed at an angle of from about 30° to 60°, and adapted to retard the advancement of the beads in the vessel, and the baffle elements of the second and fourth planes disposed with the surfaces in an opposite manner of from about 30° to 60°, and adapted to enhance the movement of the beads through the vessel.

25. The apparatus of claim 16 wherein the vessel is a vessel characterized by an interior wall surface free of impediments, other than the supporting elements, to the flow of the beads along the wall surface.

* * * * *